US010711873B2

(12) United States Patent
Krause et al.

(10) Patent No.: US 10,711,873 B2
(45) Date of Patent: Jul. 14, 2020

(54) HYDRODYNAMIC SIDE PLATE FOR TORQUE CONVERTER STATOR

(71) Applicant: Schaeffler Technologies AG & Co. KG, Herzogenaurach (DE)

(72) Inventors: Christopher Krause, Polk, OH (US); Nigel Gurney, Wooster, OH (US); Scott Strong, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 140 days.

(21) Appl. No.: 16/012,526

(22) Filed: Jun. 19, 2018

(65) Prior Publication Data

US 2019/0383375 A1    Dec. 19, 2019

(51) Int. Cl.
*F16H 45/02* (2006.01)
*F16C 17/04* (2006.01)
*F16H 41/24* (2006.01)

(52) U.S. Cl.
CPC .......... *F16H 45/02* (2013.01); *F16C 17/047* (2013.01); *F16H 2041/246* (2013.01); *F16H 2045/0294* (2013.01)

(58) Field of Classification Search
None
See application file for complete search history.

(56) References Cited

U.S. PATENT DOCUMENTS

| 4,986,397 A * | 1/1991 | Vierk ..................... F16H 45/02 192/3.3 |
| 9,719,589 B2 | 8/2017 | Depraete |
| 2012/0193182 A1 | 8/2012 | Gurney |
| 2013/0125538 A1* | 5/2013 | Frey ........................ F16O 19/52 60/330 |
| 2014/0097055 A1* | 4/2014 | Lindemann ............. F16H 45/02 192/3.21 |
| 2015/0184701 A1* | 7/2015 | Lindemann ............. F16D 33/18 60/365 |

FOREIGN PATENT DOCUMENTS

WO    WO 2016/159973 A1    10/2016

* cited by examiner

*Primary Examiner* — Timothy Hannon
(74) *Attorney, Agent, or Firm* — LeKeisha M. Suggs

(57) ABSTRACT

A hydrodynamic side plate for a stator in a torque converter includes a first radial surface, a second radial surface opposite the first radial surface, a first axial restriction surface on the first radial surface opposite an inner race of a stator assembly, a second axial restriction surface on the first radial surface opposite locking components of the stator assembly, and a plurality of hydrodynamic pads in the second radial surface separated by a plurality of corresponding radial grooves. The first axial restriction surface is configured to restrict axial movement of the inner race of the stator assembly. The second axial restriction surface is configured to restrict axial movement of the locking components of the stator assembly. The second radial surface comprises at least two anti-rotation tabs configured to prevent relative motion with the stator assembly.

19 Claims, 9 Drawing Sheets

HYDRODYNAMIC SIDE PLATE FOR TORQUE CONVERTER STATOR

BACKGROUND

Field

The present disclosure relates to torque converters and stator assemblies. More specifically, embodiments of the present disclosure relate to a hydrodynamic side plate for a stator assembly in a torque converter.

Background

A thrust bearing is a type of bearing used to replace traditional roller bearings in a stator assembly in a torque converter. One or more thrust bearings may be used in a stator assembly to accommodate axial loads. A torque converter may include a thrust bearing axially between an impeller and a stator assembly or axially between a turbine and a stator assembly. Thrust bearings subsume substantial axial space and there is a need for improved bearing designs.

BRIEF SUMMARY

In some embodiments, a hydrodynamic side plate for a stator in a torque converter includes a first radial surface, and a second radial surface opposite the first radial surface. In some embodiments, the hydrodynamic side plate includes an inner circumferential surface defining an opening concentric with an axis of rotation and an outer circumferential surface. In some embodiments, the hydrodynamic side plate includes a first axial restriction surface on the first radial surface opposite an inner race of a stator assembly. In some embodiments, the hydrodynamic side plate includes a second axial restriction surface on the first radial surface opposite locking components of the stator assembly. In some embodiments, the hydrodynamic side plate includes a plurality of hydrodynamic pads in the second radial surface separated by a plurality of corresponding radial grooves. In some embodiments, the first axial restriction surface is configured to restrict axial movement of the inner race of the stator assembly. In some embodiments, the second axial restriction surface is configured to restrict axial movement of the locking components of the stator assembly. In some embodiments, the second radial surface comprises at least two anti-rotation tabs configured to prevent relative motion with the stator assembly.

In some embodiments, the first axial restriction surface is a flat recess. In some embodiments, the flat recess includes a fillet. In some embodiments, the flat recess is filleted. In some embodiments, the second axial restriction surface is a protruding plateau or filleted plateau. In some embodiments, the first radial surface includes one or more empty pockets opposite the plurality of hydrodynamic pads. In some embodiments, the second axial restriction surface includes a recess and a helical spring washer disposed in the recess. In some embodiments, the second axial restriction surface includes an injected insert. In some embodiments, the second axial restriction surface includes a groove and a coil spring disposed in the groove. In some embodiments, there are at least two anti-rotation tabs are disposed in at least two stator pockets of the stator assembly. In some embodiments, the hydrodynamic side plate includes a hollow section and a snap portion. In some embodiments, the snap portion is configured to snap fit into a radial groove of the stator assembly through a lead-in chamfer. In some embodiments, the hydrodynamic side plate includes an outer circumferential surface retained in at least overhangs of the stator assembly.

In some embodiments, a stator assembly includes a base including a plurality of stator blades, an inner race including a plurality of splines, an outer race, and locking components disposed between the inner and outer races. In some embodiments, the stator assembly includes a one-way clutch. In some embodiments, the locking components are configured to function as a one-way clutch. In some embodiments, the stator assembly includes a hydrodynamic side plate disposed on the stator assembly. In some embodiments, the hydrodynamic side plate is configured to secure the one-way clutch in place within the stator assembly. In some embodiments, the hydrodynamic side plate of the stator assembly includes a first radial surface and a second radial surface opposite the first radial surface. In some embodiments, the hydrodynamic side plate of the stator assembly includes an inner circumferential surface defining an opening concentric with an axis of rotation and an outer circumferential surface. In some embodiments, the hydrodynamic side plate of the stator assembly includes a first axial restriction surface on the first radial surface opposite the inner race of the stator assembly. In some embodiments, the hydrodynamic side plate of the stator assembly includes a second axial restriction surface on the first radial surface opposite locking components of the stator assembly. In some embodiments, the hydrodynamic side plate of the stator assembly includes a plurality of hydrodynamic pads in the second radial surface separated by a plurality of corresponding radial grooves.

In some embodiments, the first axial restriction surface is a flat recess and the second axial restriction surface is a protruding plateau or filleted plateau. In some embodiments, the first radial surface includes one or more empty pockets opposite the plurality of hydrodynamic pads and the at least two anti-rotation tabs are disposed in at least two stator pockets of the stator assembly. In some embodiments, the second axial restriction surface includes a recess and a helical spring washer disposed in the recess, and the hydrodynamic side plate includes a hollow section and a snap portion. In some embodiments, the snap portion is configured to snap fit into a radial groove of the stator assembly through a lead-in chamfer. In some embodiments, the second axial restriction surface includes a groove and a coil spring disposed in the groove, and the hydrodynamic side plate includes an outer circumferential surface retained in at least two overhangs of the stator assembly.

In some embodiments, a torque converter includes a stator assembly, a turbine including a plurality of turbine blades, and an impeller including a plurality of impeller blades and an impeller shell. In some embodiments, the stator assembly of the torque converter includes a base including a plurality of stator blades, an inner race including a plurality of splines, an outer race, and locking components disposed between the inner and outer races. In some embodiments, the torque converter includes a hydrodynamic side plate disposed between the stator assembly and the impeller shell. In some embodiments, the hydrodynamic side plate of the torque converter includes a first radial surface and a second radial surface opposite the first radial surface. In some embodiments, the hydrodynamic side plate of the torque converter includes an inner circumferential surface defining an opening concentric with an axis of rotation and an outer circumferential surface. In some embodiments, the hydrodynamic side plate of the torque converter includes a first axial restriction surface on the first radial surface opposite the inner race of the stator assembly. In some embodiments, the hydrodynamic side plate of the torque converter includes a second axial restriction surface on the first radial surface opposite locking components of the stator assembly. In some embodiments, the hydrodynamic side plate of the torque converter includes a plurality of hydrodynamic pads on the second radial surface separated by a plurality of corresponding radial grooves.

BRIEF DESCRIPTION OF THE DRAWINGS

The accompanying drawings, which are incorporated herein and form a part of the specification, illustrate the embodiments and, together with the description, further serve to explain the principles and to enable a person skilled in the relevant art(s) to make and use the embodiments. Objects and advantages of illustrative, non-limiting embodiments will become more apparent by describing them in detail with reference to the attached drawings.

Figure 1A:
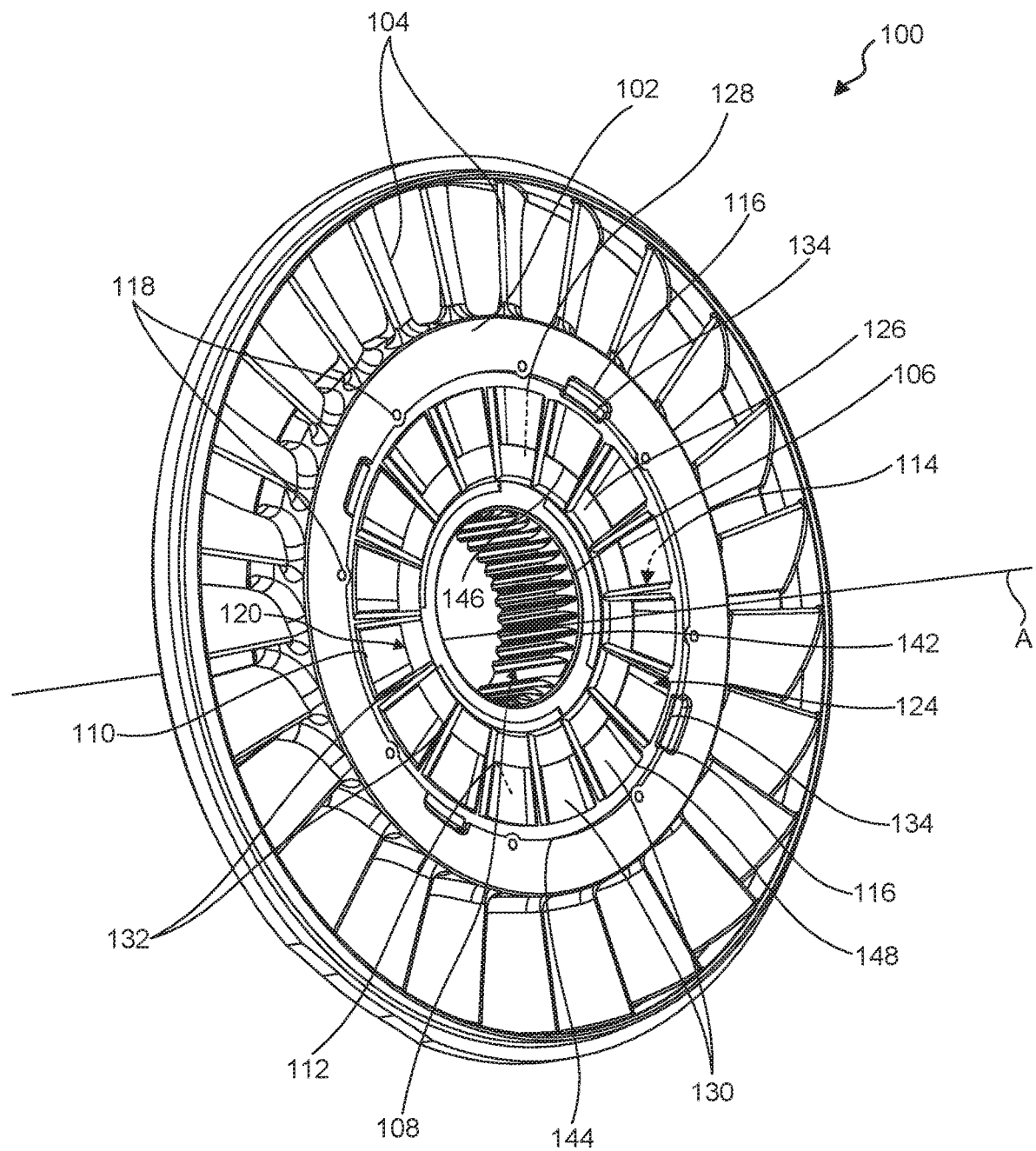
FIGS. 1A and 1B illustrate a perspective view of a hydrodynamic side plate for a stator assembly according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Torque converters are used in mechanics and fluid dynamics. A turbine and an impeller in a torque converter direct fluid in opposite directions during normal operation and create a fluid coupling with no torque multiplication. Generally, stator assemblies redirect the flow of fluid exiting the turbine before being reintroduced to the impeller. A stator assembly disposed between the turbine and the impeller creates a multiplication of torque. Typically, a stator is fixed against rotation in one direction and allowed to free-wheel in the opposite direction through the use of a one-way clutch. For example, equally spaced sprags or figure-eight shaped bars disposed between an inner and an outer race of the stator act as locking components, and produce a wedging force to prevent rotation of the stator in one direction. Alternatively, for example, the outer race can include equally spaced wedge shaped segments that retain free-wheel components (e.g., rollers and springs), and produce a wedging force to prevent rotation of the stator in one direction. Thus, the stator is locked against rotation unless the fluid of the torque converter is traveling in the same direction as the impeller.

A side plate may be included in the stator assembly to retain components of the one-way clutch within the stator body. The axial surface of the stator body forms a continuous axial surface, which can be either a flat surface or an annular raised ring. A thrust bearing may be disposed between a stator assembly and an impeller. A thrust bearing may be interchangeably referred to as a hydrodynamic bearing, hydrodynamic washer, thrust washer, or simply a bearing or washer. The thrust bearing may include retention features to secure the thrust bearing to a stator side plate or the impeller. Axial retention features secure the thrust bearing, and anti-rotation features prevent thrust bearing's relative motion with respect to the side plate.

Torque converters may include thrust bearings on axially opposite sides of the one-way clutch, one disposed between the impeller and the one-way clutch, and one disposed between the turbine and the one-way clutch. Thrust bearings limit the overall movement of the turbine, and the stator in the axial direction. Previous designs requiring staking or interference fitting the thrust bearing to the stator side plate are often undesirable. The staking operation uses controlled tooling and staking forces to ensure the thrust bearing is secured (i.e., does not fall in torque converter). Other previous designs use snap-fit features in order to secure the thrust bearing to the stator side plate. Moreover, thrust bearings are costly and subsume a significant amount of axial space in the torque converter.

There is a need to simplify the design and reduce the axial space of a stator assembly in a torque converter for new compact torque converter designs. Reducing the size of thrust bearings may reduce the overall mass, axial length, and cost of the torque converter. New compact torque converter designs that improve performance while reducing costs are possible. The herein described hydrodynamic side plate for a stator assembly in a torque converter is useful for new compact torque converter designs and reduces complexity, axial space, the number of components, overall mass, and overall costs.

Embodiments of a hydrodynamic side plate for a stator assembly and related systems are described herein. Embodiments include a hydrodynamic side plate that includes a thrust bearing and a side plate in a single formed piece. In embodiments, the hydrodynamic side plate may save axial space, reduce overall components, and/or decrease material and storage costs.

Figure 1B:
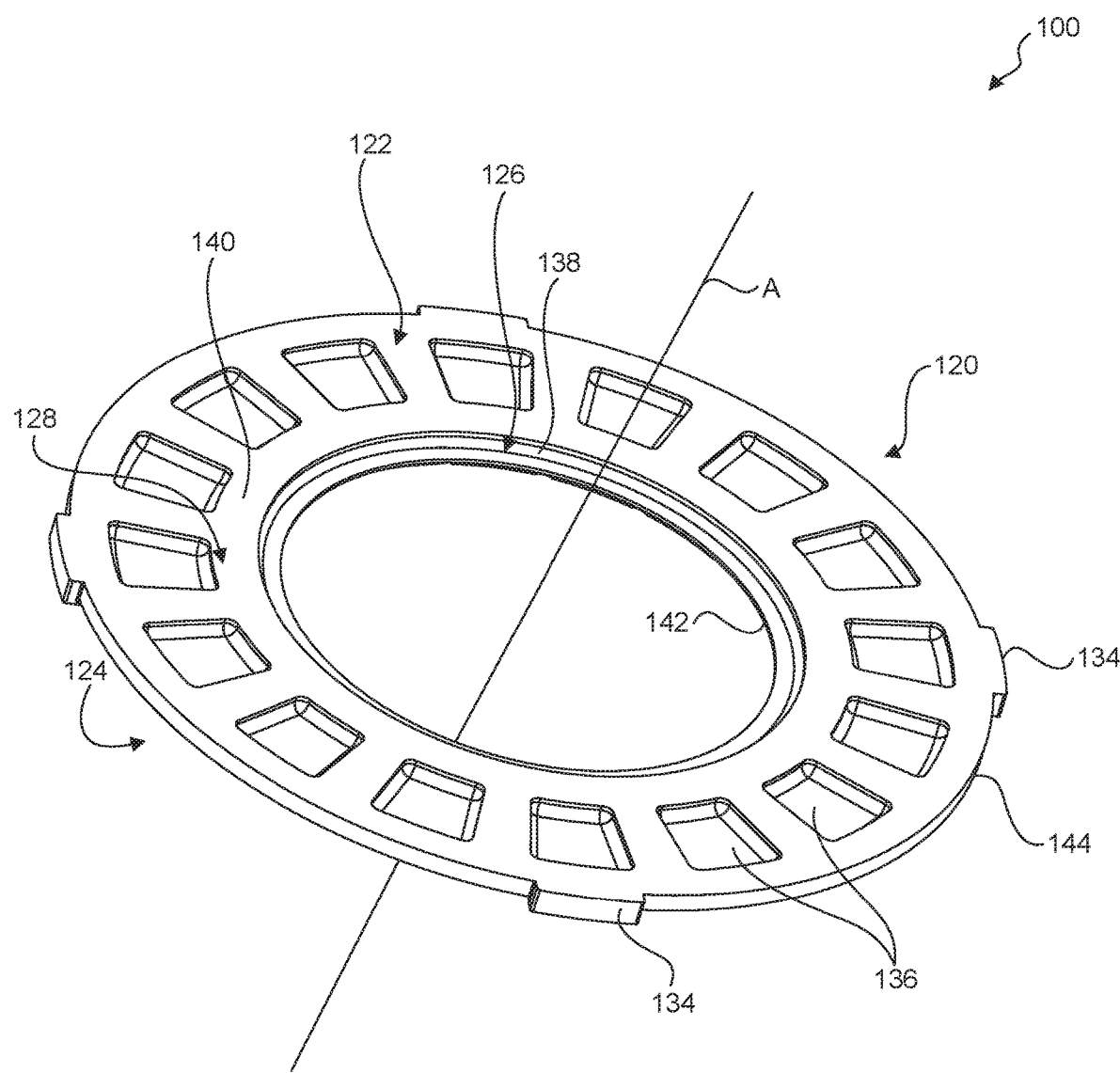

Referring to FIGS. 1A and 1B, staked hydrodynamic side plate 120 is a single formed piece configured to function as a thrust bearing and a stator side plate. Staked hydrodynamic side plate 120 includes a first radial surface 122 and a second radial surface 124 disposed opposite first radial surface 122. In one embodiment, hydrodynamic pads 130 and radial grooves 132 are disposed in second radial surface 124. In one embodiment, staked hydrodynamic side plate 120 is disposed on stator base 102 of stator assembly 100 and secured by a plurality of staked punches 118 disposed in stator base 102 and anti-rotation tabs 134 disposed in stator pockets 116. Stator base 102 includes stator pockets 116 and staked punches 118. In some embodiments, stator pockets 116 may be formed in stator base 102 by molding, machining, extrusion, or any other suitable process or method. In some embodiments, stator pockets 116 are symmetrically arranged on stator base 102 to couple to corresponding anti-rotation tabs 134. In some embodiments, staked punches 118 may be formed in stator base 102 manually, automatically, or by any other suitable process or method. In some embodiments, staked punches 118 are symmetrically arranged on stator base 102 to couple to outer circumferential surface 144 on staked hydrodynamic side plate 120. Staked punches 118 secure staked hydrodynamic side plate 120 to stator base 102 and function as axial retention means, and anti-rotation tabs 134 prevent rotation of staked hydrodynamic side plate 120. In operation, as fluid is introduced and adheres to second radial surface 124, the fluid forms a converging wedge from high shear forces and internal pressure builds. This, in turn, allows the fluid to permeate radially outward, via radial grooves 132 and hydrodynamic pads 130, between second radial surface 124 and a mating surface (e.g., an impeller shell). As shown, for example, in FIG. 1A, both stator assembly 100 and staked hydrodynamic side plate 120 are aligned along rotational axis A.

Staked hydrodynamic side plate 120 is defined by first radial surface 122, second radial surface 124 opposite first radial surface 122, inner circumferential surface 142, and outer circumferential surface 144 to form a generally flat annulus. Second radial surface 124 includes hydrodynamic pads 130, radial grooves 132, and anti-rotation tabs 134. Hydrodynamic pads 130 form a raised annulus in second radial surface 124, and each hydrodynamic pad 130 is separated by uniformly recessed radial grooves 132. Hydrodynamic pads 130 are radially defined by inner hydrodynamic pad circumferential surface 146 and outer hydrodynamic pad circumferential surface 148. In some embodiments, staked punches 118 can include interference fits for securing staked hydrodynamic side plate 120 to stator base 102. In some embodiments, staked hydrodynamic side plate 120 includes at least two anti-rotation tabs 134. For example, anti-rotation tabs 134 are spaced apart by about 180 degrees. In some embodiments, staked hydrodynamic side plate 120 includes at least four anti-rotation tabs 134. For example, anti-rotation tabs 134 are spaced apart by about 90 degrees. In some embodiments, staked hydrodynamic side plate 120 includes at least two staked punches 118. For example, staked punches 118 are spaced apart by about 180 degrees. In some embodiments, staked hydrodynamic side plate 120 includes at least four staked punches 118. For example, staked punches 118 are spaced apart by about 90 degrees. In some embodiments, staked hydrodynamic side plate 120 includes at least eight staked punches 118. For example, staked punches 118 are spaced apart by about 45 degrees. First radial surface 122 of staked hydrodynamic side plate 120 secures one-way clutch 114 of stator assembly 100. One-way clutch 114 includes inner race 106, locking components 112, and outer race 110. Locking components 112 can include rollers and springs (not shown) disposed in wedge shaped segments (not shown), and be configured to produce a wedging force in one rotational direction (e.g., counter-clockwise as viewed from engine to transmission) to prevent rotation of stator assembly 100 in one direction. Stator base 102 includes a plurality of stator blades 104 and inner race 106 is splined via a plurality of splines 108 to a stator assembly shaft (not shown).

Staked hydrodynamic side plate 120 is a single formed piece. In some embodiments, staked hydrodynamic side plate 120 is integrally molded. In some embodiments, staked hydrodynamic side plate 120 is integrally machined. In some embodiments, staked hydrodynamic side plate 120 is integrally extruded. In some embodiments, staked hydrodynamic side plate 120 is monolithic. In some embodiments, staked hydrodynamic side plate 120 includes a thrust bearing and a stator side plate which are separate and connected elements because the thrust bearing is snap-fitted to the staked stator side plate. In some embodiments, staked hydrodynamic side plate 120 includes a thrust bearing and a stator side plate which are not coupled together because of a longer axial transmission space in a stator assembly or a torque converter.

Staked hydrodynamic side plate 120 can be formed by known manufacturing processes and methods in the art, including, but not limited to molding (e.g., injection, reaction injection, sintering, laminating, matrix, blow, compression, film insert, gas assist, rotational, structural foam, piece, plastic, casting, spin casting, die casting, transfer, thermoforming, vacuum, etc.), machining (e.g., milling, turning, drilling, reaming, sawing, filing, fettling, boring, broaching, shaping, planing, tapping, electrical discharge, EDM, electrochemical, electron beam, photochemical, ultrasonic, laser cutting, water jet cutting, etc.), extrusion (e.g., profile, hot, cold, warm, friction, micro, direct, indirect, hydrostatic, etc.), or any other suitable process or method. Staked hydrodynamic side plate 120 can be a metal (e.g., copper, aluminum, titanium, iron, cast iron, steel, etc.), a polymer (e.g., plastic, thermoplastic, polyamide, Torlon®, polytetrafluoroethylene (PTFE), polyether, polyether ether ketone (PEEK), resin, polyoxymethylene, phenolics, acetals, nylon, rigid machinable polymer, etc.), a ceramic (e.g., zirconia, silicon nitride, alumina, silicon carbide, etc.), or any other suitable material. In some embodiments, staked hydrodynamic side plate 120 is rigid. In some embodiments, staked hydrodynamic side plate 120 is flexible. In some embodiments, staked hydrodynamic side plate 120 has suitable mechanical properties, wear resistance, and/or ample flexibility.

Figure 3:
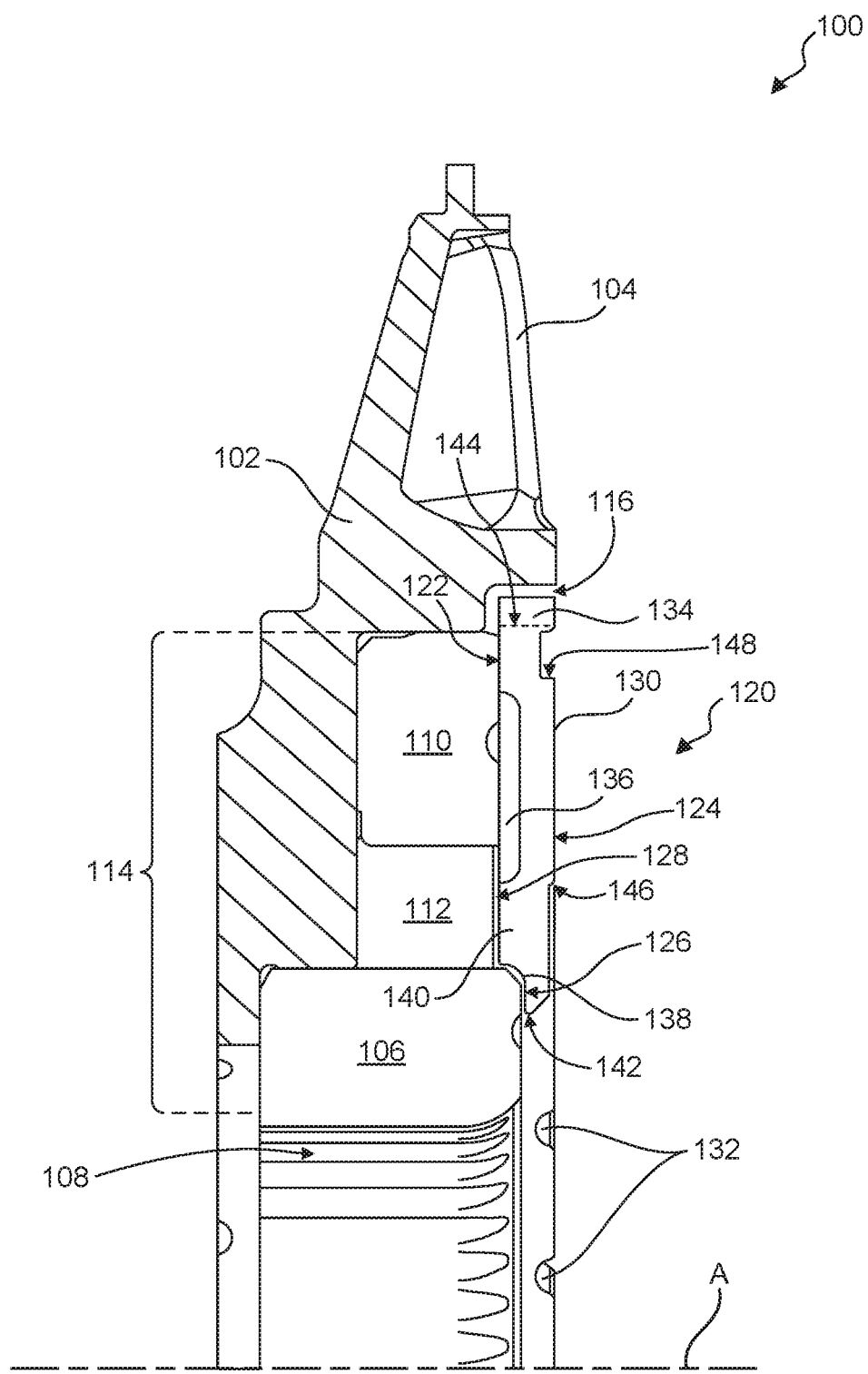
FIG. 3 illustrates a partial cross-sectional view of the hydrodynamic side plate for the stator assembly of FIGS. 1A and 1B according to an embodiment.

Referring to FIG. 3, staked hydrodynamic side plate 120 includes first axial restriction surface 126, second axial restriction surface 128, and one or more empty pockets 136. First axial restriction surface 126 restricts the axial movement of inner race 106 along rotational axis A. In an embodiment, first axial restriction surface 126 includes a flat recess 138. In some embodiments, flat recess 138 can include a fillet. In some embodiments, flat recess 138 can be filleted. In some embodiments, flat recess 138 is a flat recess formed in first radial surface 122, for example, by machining or molding first radial surface 122. In some embodiments, flat recess 138 is a flat recess formed in first radial surface 122, for example, by integrally molding or joining an additional piece to first radial surface 122. In some embodiments, flat recess 138 is a flat recess formed in first radial surface 122, for example, by machining or molding first radial surface 122. In some embodiments, flat recess 138 is a flat recess formed in first radial surface 122, for example, by integrally molding or joining an additional piece to first radial surface 122. In some embodiments, first axial restriction surface 126 can be a bevel, a chamfer, an arc shape, or any other suitable shape matching the opposing surfaces to axially restrict inner race 106. Second axial restriction surface 128 restricts the axial movement of locking components 112, such as rollers and springs (not shown) and wedge shaped segments (not shown), along rotational axis A. Second axial restriction surface 128 includes protruding or filleted plateau 140. In some embodiments, protruding or filleted plateau 140 is a protruding plateau formed in first radial surface 122, for example, by machining or molding first radial surface 122. In some embodiments, protruding or filleted plateau 140 is a filleted plateau formed in first radial surface 122, for example, by integrally molding or joining an additional piece to first radial surface 122. In some embodiments, second axial restriction surface 128 can be a mesa, a butte, a convex shape, or any other suitable shape to axially restrict locking components 112. One or more empty pockets 136 are formed in staked hydrodynamic side plate 120 and define a space between second axial restriction surface 128 and outer circumferential surface 144. In an embodiment, one or more empty pockets 136 may reduce overall mass and material cost. In an embodiment, one or more empty pockets 136 are formed in first radial surface 122 and are positioned opposite hydrodynamic pads 130 in second radial surface 124.

In some embodiments, the overall width, along a line through stator pockets 116 and parallel to rotational axis A, of stator base 102, compared to prior stator base designs, can be reduced by about 0.5 mm. In some embodiments, the overall width, along a line through hydrodynamic pads 130 and parallel to rotational axis A, of stator assembly 100 with staked hydrodynamic side plate 120, compared to prior stator assembly designs, can be reduced by about 2.8 mm. In some embodiments, a lighter point punch staking technique can be used for staked punches 118 on stator base 102 to create a distinct material overlap to secure staked hydrodynamic side plate 120. For example, compared to prior staking operations (e.g., 5 mm×2.2 mm×10 degree punch, etc.), the lighter point punch staking technique for staked punches 118 on stator base 102 can reduce material displacement and pressure which may cause cracking or chipping in stator base 102 and/or staked hydrodynamic side plate 120.

Figure 2A:
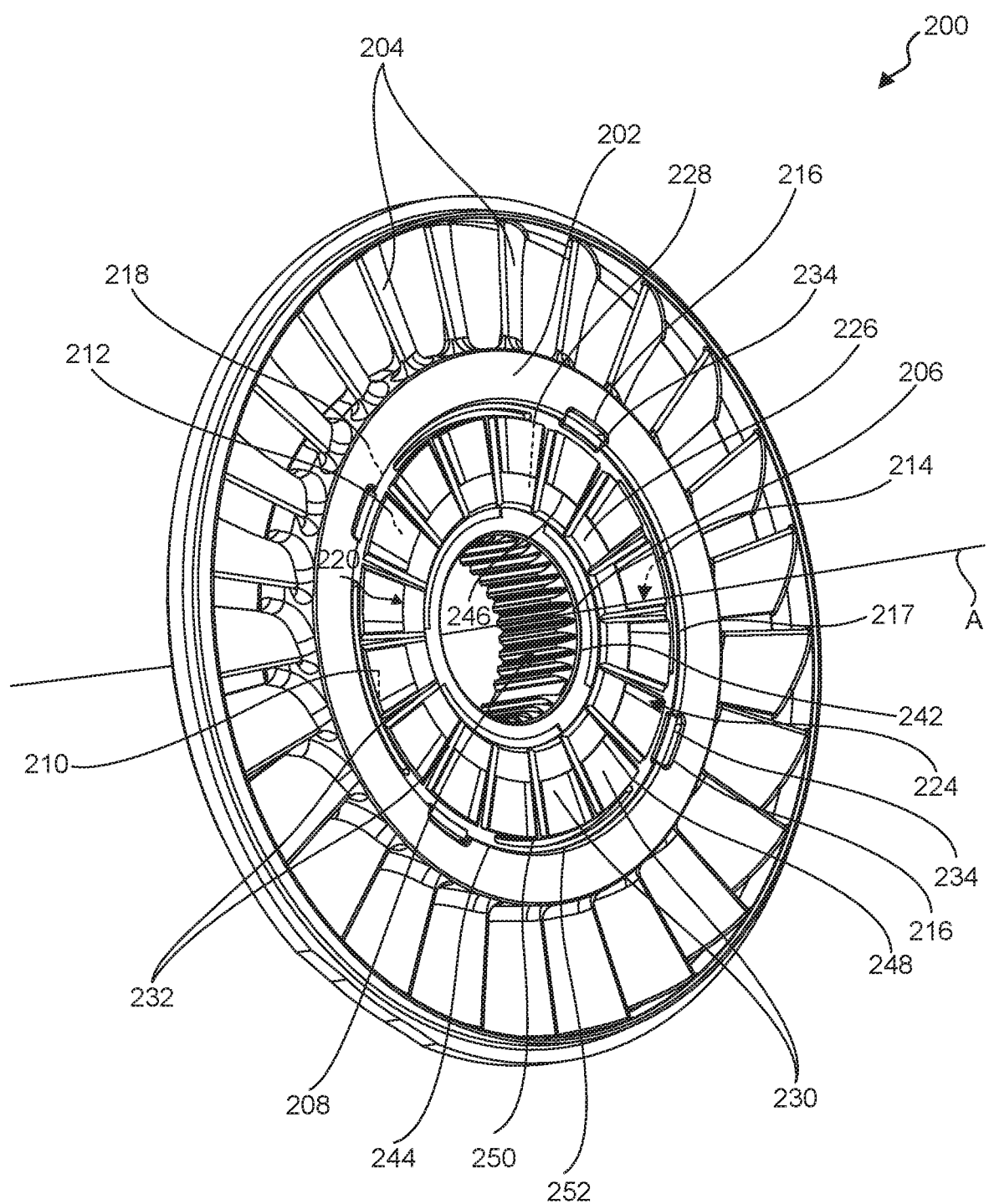
FIGS. 2A and 2B illustrate a perspective view of a hydrodynamic side plate for a stator assembly according to an embodiment.
Figure 2B:
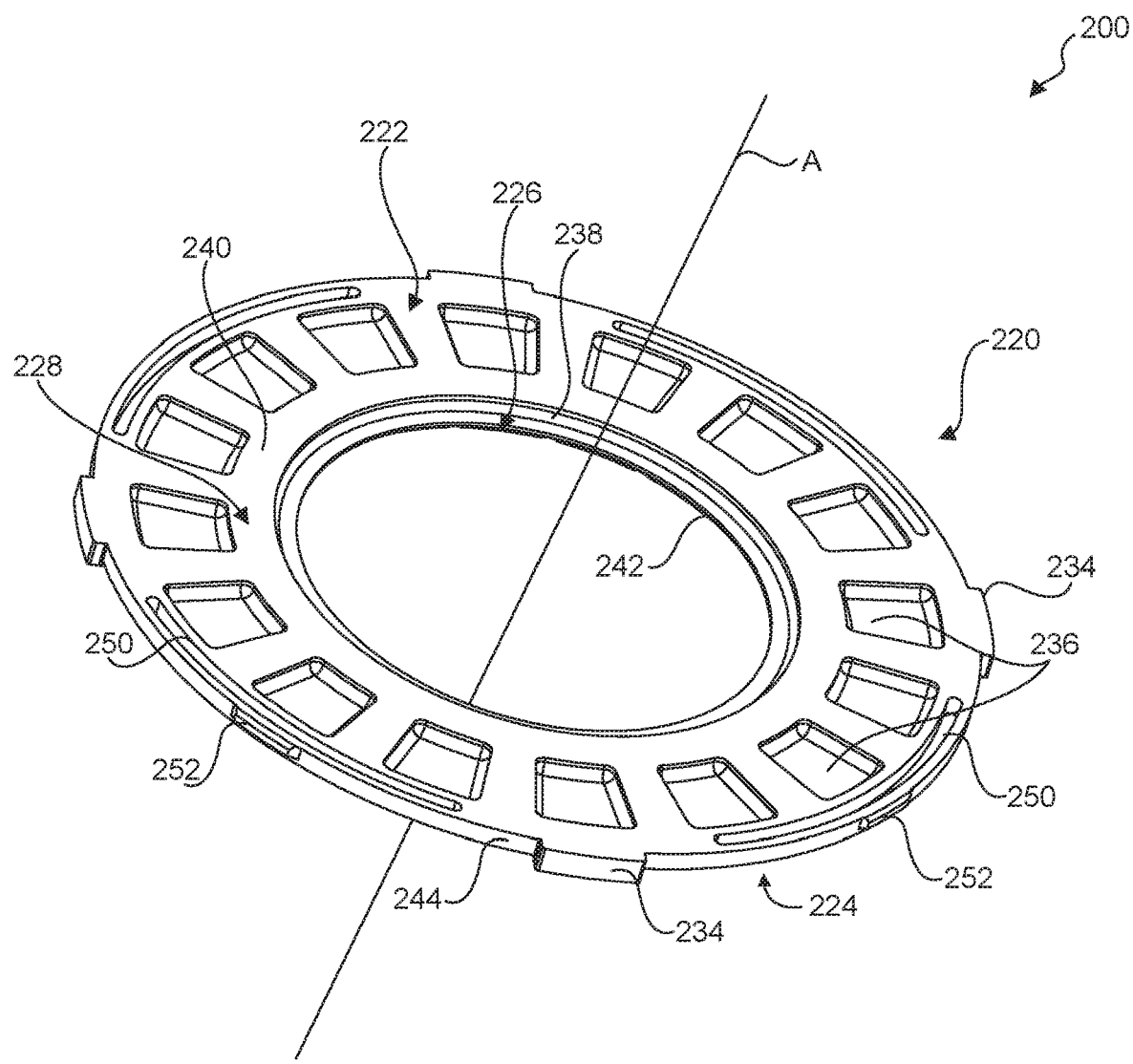

Referring to FIGS. 2A and 2B, snapped hydrodynamic side plate 220 is similar to staked hydrodynamic side plate 120 of FIGS. 1A, 1B, and 3. Snapped hydrodynamic side plate 220 is a single formed piece configured to function as a thrust bearing and a stator side plate. Snapped hydrodynamic side plate 220 includes a first radial surface 222, a second radial surface 224 disposed opposite first radial surface 222, a hollow section 250, and a snap portion 252. In one embodiment, hydrodynamic pads 230 and radial grooves 232 are disposed in second radial surface 224. In one embodiment, snapped hydrodynamic side plate 220 is disposed on stator base 202 of stator assembly 200 and secured by radial groove 218 and lead-in chamfer 217 disposed in stator base 202 and anti-rotation tabs 234 disposed in stator pockets 216. Stator base 202 includes stator pockets 216, radial groove 218, and lead-in chamfer 217. In some embodiments, stator pockets 216 may be formed in stator base 202 by molding, machining, extrusion, or any other suitable process or method. In some embodiments, stator pockets 216 are symmetrically arranged on stator base 202 to couple to corresponding anti-rotation tabs 234. In some embodiments, radial groove 218 and lead-in chamfer 217 may be formed in stator base 202 manually, automatically, or by any other suitable process or method. In some embodiments, radial groove 218 can be a bevel, a chamfer, an arc shape, or any other suitable shape with a vertical contact surface to retain corresponding one or more snap portions 252 of snapped hydrodynamic side plate 220. In some embodiments, radial groove 218 and lead-in chamfer 217 are symmetrically arranged on stator base 202 to couple to one or more snap portions 252 of snapped hydrodynamic side plate 220. In some embodiments, radial groove 218 and lead-in chamfer 217 are circumferentially arranged on stator base 202 to couple to one or more snap portions 252 of snapped hydrodynamic side plate 220. One or more snap portions 252 secure snapped hydrodynamic side plate 220 to stator base 202 and function as axial retention means, and anti-rotation tabs 234 prevent rotation of snapped hydrodynamic side plate 220. In operation, as fluid is introduced and adheres to second radial surface 224, the fluid forms a converging wedge from high shear forces and internal pressure builds. This, in turn, allows the fluid to permeate radially outward, via radial grooves 232 and hydrodynamic pads 230, between second radial surface 224 and a mating surface (e.g., an impeller shell). As shown, for example, in FIG. 2A, both stator assembly 200 and snapped hydrodynamic side plate 220 are aligned along rotational axis A.

Snapped hydrodynamic side plate 220 is defined by first radial surface 222, second radial surface 224 opposite first radial surface 222, inner circumferential surface 242, and outer circumferential surface 244 to form a generally flat annulus. Snapped hydrodynamic side plate 220 includes one or more hollow sections 250 extending through first radial surface 222, to opposing clearance surface, and one or more snap portions 252 protruding from outer circumferential surface 244. Second radial surface 224 includes hydrodynamic pads 230, radial grooves 232, and anti-rotation tabs 234. Hydrodynamic pads 230 form a raised annulus in second radial surface 224, and each hydrodynamic pad 230 is separated by uniformly recessed radial grooves 232. Hydrodynamic pads 230 are radially defined by inner hydrodynamic pad circumferential surface 246 and outer hydrodynamic pad circumferential surface 248. In some embodiments, snap portions 252 can include a bevel, a chamfer, a pillar, a plateau, a fillet, a mesa, a butte, an arc shape, a convex shape, or any other suitable radially protruding shape for securing snapped hydrodynamic side plate 220 to radial groove 218 and lead-in chamfer 217 of stator base 202. In some embodiments, snapped hydrodynamic side plate 220 includes at least two anti-rotation tabs 234. For example, anti-rotation tabs 234 are spaced apart by about 180 degrees. In some embodiments, snapped hydrodynamic side plate 220 includes at least four anti-rotation tabs 234. For example, anti-rotation tabs 234 are spaced apart by about 90 degrees. In some embodiments, snapped hydrodynamic side plate 220 includes at least two snap portions 252. For example, snap portions 252 are spaced apart by about 180 degrees. In some embodiments, snapped hydrodynamic side plate 220 includes at least four snap portions 252. For example, snap portions 252 are spaced apart by about 90 degrees. In some embodiments, snapped hydrodynamic side plate 220 includes at least eight snap portions 252. For example, snap portions 252 are spaced apart by about 45 degrees. In some embodiments, snapped hydrodynamic side plate 220 includes a corresponding hollow section 250 for each snap portion 252. First radial surface 222 of snapped hydrodynamic side plate 220 secures one-way clutch 214 of stator assembly 200. One-way clutch 214 includes inner race 206, locking components 212, and outer race 210. Locking components 212 can include rollers and springs (not shown) disposed in wedge shaped segments (not shown), and be configured to produce a wedging force in one rotational direction (e.g., counter-clockwise as viewed from engine to transmission) to prevent rotation of stator assembly 200 in one direction. Stator base 202 includes a plurality of stator blades 204 and inner race 206 is splined via a plurality of splines 208 to a stator assembly shaft (not shown).

Snapped hydrodynamic side plate 220 is a single formed piece. In some embodiments, snapped hydrodynamic side plate 220 is integrally molded. In some embodiments, snapped hydrodynamic side plate 220 is integrally machined. In some embodiments, snapped hydrodynamic side plate 220 is integrally extruded. In some embodiments, snapped hydrodynamic side plate 220 is monolithic. In some embodiments, snapped hydrodynamic side plate 220 includes a thrust bearing and a stator side plate which are separate and connected elements because the thrust bearing is snap-fitted to the snapped stator side plate. In some embodiments, snapped hydrodynamic side plate 220 includes a thrust bearing and a stator side plate which are not coupled together because of a longer axial transmission space in a stator assembly or a torque converter.

Snapped hydrodynamic side plate 220 can be formed by known manufacturing processes and methods in the art, including, but not limited to molding (e.g., injection, reaction injection, sintering, laminating, matrix, blow, compression, film insert, gas assist, rotational, structural foam, piece, plastic, casting, spin casting, die casting, transfer, thermoforming, vacuum, etc.), machining (e.g., milling, turning, drilling, reaming, sawing, filing, fettling, boring, broaching, shaping, planing, tapping, electrical discharge, EDM, electrochemical, electron beam, photochemical, ultrasonic, laser cutting, water jet cutting, etc.), extrusion (e.g., profile, hot, cold, warm, friction, micro, direct, indirect, hydrostatic, etc.), or any other suitable process or method. Snapped hydrodynamic side plate 220 can be a metal (e.g., copper, aluminum, titanium, iron, cast iron, steel, etc.), a polymer (e.g., plastic, thermoplastic, polyamide, Torlon®, polytetrafluoroethylene (PTFE), polyether, polyether ether ketone (PEEK), resin, polyoxymethylene, phenolics, acetals, nylon, rigid machinable polymer, etc.), a ceramic (e.g., zirconia, silicon nitride, alumina, silicon carbide, etc.), or any other suitable material. In some embodiments, snapped hydrodynamic side plate 220 is rigid. In some embodiments, snapped hydrodynamic side plate 220 is flexible. In some embodiments, snapped hydrodynamic side plate 220 has suitable mechanical properties, wear resistance, and/or ample flexibility.

Referring to FIGS. 2A and 2B, snapped hydrodynamic side plate 220 includes first axial restriction surface 226, second axial restriction surface 228, and one or more empty pockets 236. First axial restriction surface 226 restricts the axial movement of inner race 206 along rotational axis A. In an embodiment, first axial restriction surface 226 includes a flat recess 238. In some embodiments, flat recess 238 is a flat recess formed in first radial surface 222, for example, by machining or molding first radial surface 222. In some embodiments, flat recess 238 is a flat recess formed in first radial surface 222, for example, by integrally molding or joining an additional piece to first radial surface 222. In some embodiments, flat recess 238 is a flat recess formed in first radial surface 222, for example, by machining or molding first radial surface 222. In some embodiments, flat recess 238 is a flat recess fillet formed in first radial surface 222, for example, by integrally molding or joining an additional piece to first radial surface 222. In some embodiments, first axial restriction surface 226 can be a bevel, a chamfer, an arc shape, or any other suitable shape matching the opposing surfaces to axially restrict inner race 206. Second axial restriction surface 228 restricts the axial movement of locking components 212, such as rollers and springs (not shown) and wedge shaped segments (not shown), along rotational axis A. Second axial restriction surface 228 includes protruding or filleted plateau 240. In some embodiments, protruding or filleted plateau 240 is a protruding plateau formed in first radial surface 222, for example, by machining or molding first radial surface 222. In some embodiments, protruding or filleted plateau 240 is a filleted plateau formed in first radial surface 222, for example, by integrally molding or joining an additional piece to first radial surface 222. In some embodiments, second axial restriction surface 228 can be a mesa, a butte, a convex shape, or any other suitable shape to axially restrict locking components 212. One or more empty pockets 236 are formed in snapped hydrodynamic side plate 220 and define a space between second axial restriction surface 228 and outer circumferential surface 244. In an embodiment, one or more empty pockets 236 may reduce overall mass and material cost. In an embodiment, one or more empty pockets 236 are formed in first radial surface 222 and are positioned opposite hydrodynamic pads 230 in second radial surface 224.

In some embodiments, the overall width, along a line through stator pockets 216 and parallel to rotational axis A, of stator base 202, compared to prior stator base designs, can be reduced by about 0.5 mm. In some embodiments, the overall width, along a line through hydrodynamic pads 230 and parallel to rotational axis A, of stator assembly 200 with snapped hydrodynamic side plate 220, compared to prior stator assembly designs, can be reduced by about 2.8 mm. In an embodiment, snap portion 252 includes a notch on a distal end which may couple to radial groove 218 and lead-in chamfer 217. In some embodiments, snap portion 252 and hollow section 250 are integrally formed. In some embodiments, snap portion 252 and hollow section 250 are integrally molded. In some embodiments, snap portion 252 and hollow section 250 are integrally machined. In some embodiments, snap portion 252 and hollow section 250 are integrally extruded. In some embodiments, snap portion 252 and hollow section 250 are monolithic. Hollow section 250 provides flexibility to snap portion 252 in order to bend, snap, and secure snap portion 252 into radial groove 218 and lead-in chamfer, which secures snapped hydrodynamic side plate 220 to stator base 202.

Figure 4:
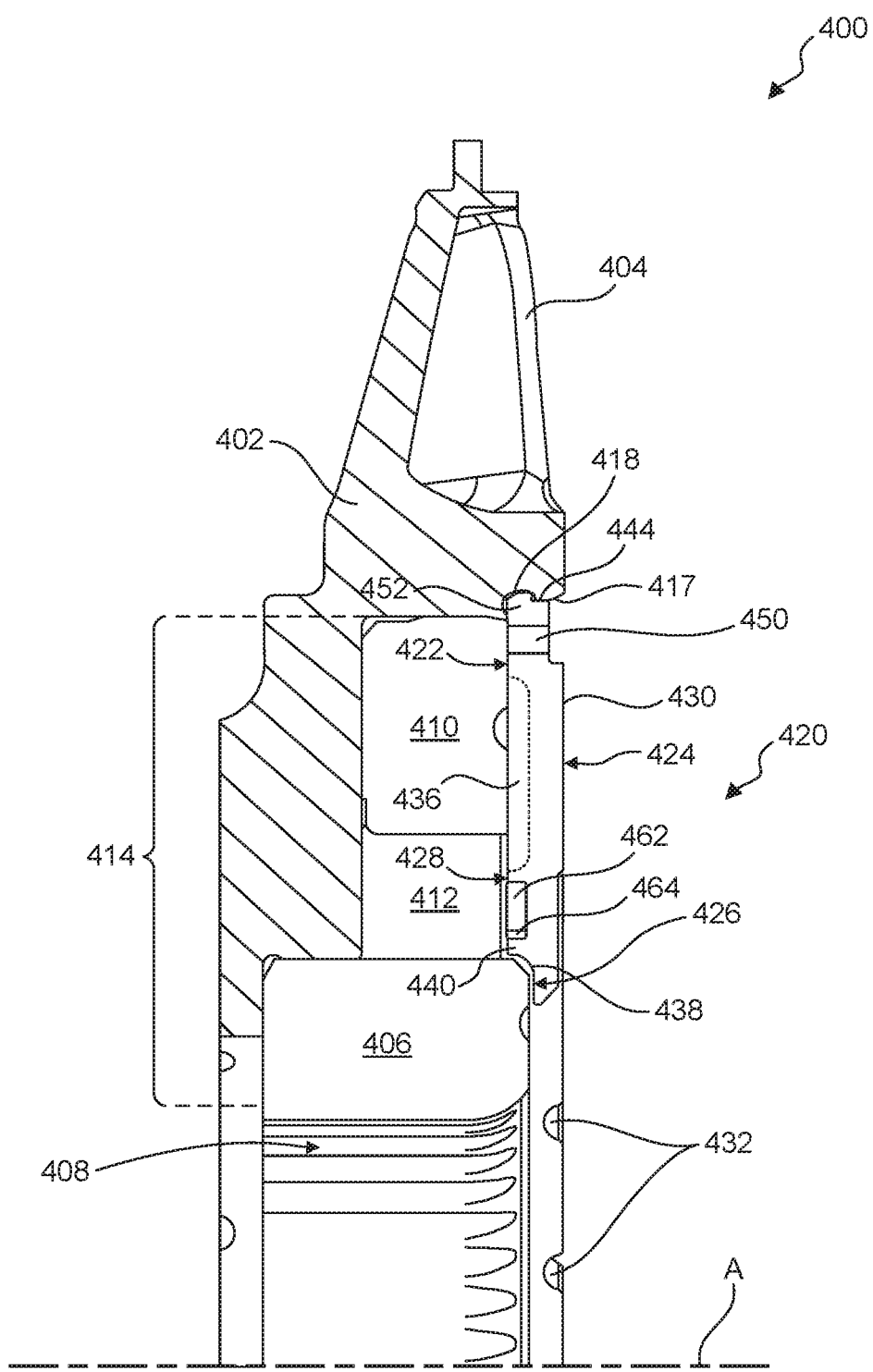
FIG. 4 illustrates a partial cross-sectional view of a hydrodynamic side plate for a stator assembly according to an embodiment.
Figure 5:
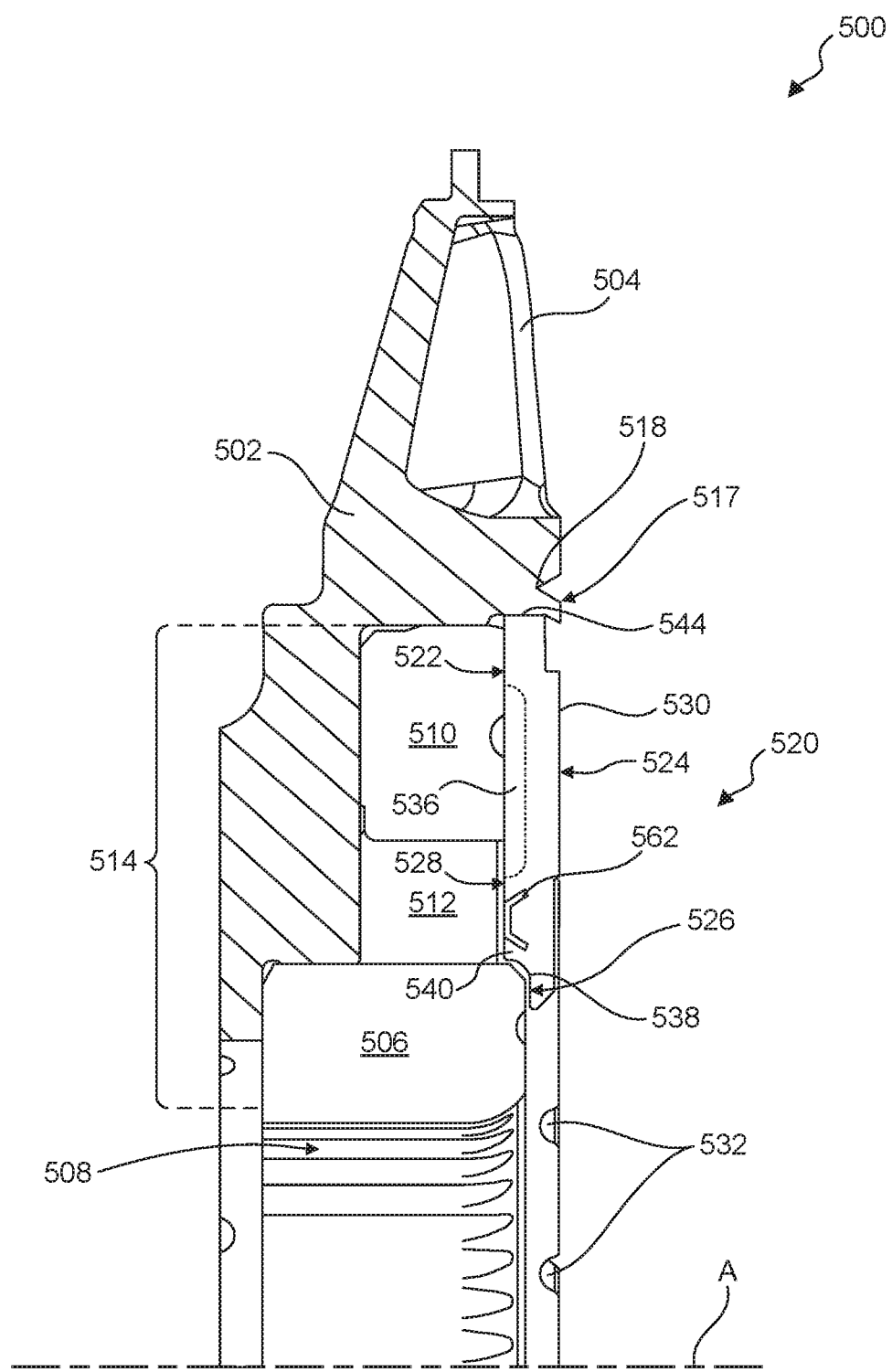
FIG. 5 illustrates a partial cross-sectional view of a hydrodynamic side plate for a stator assembly according to an embodiment.
Figure 6:
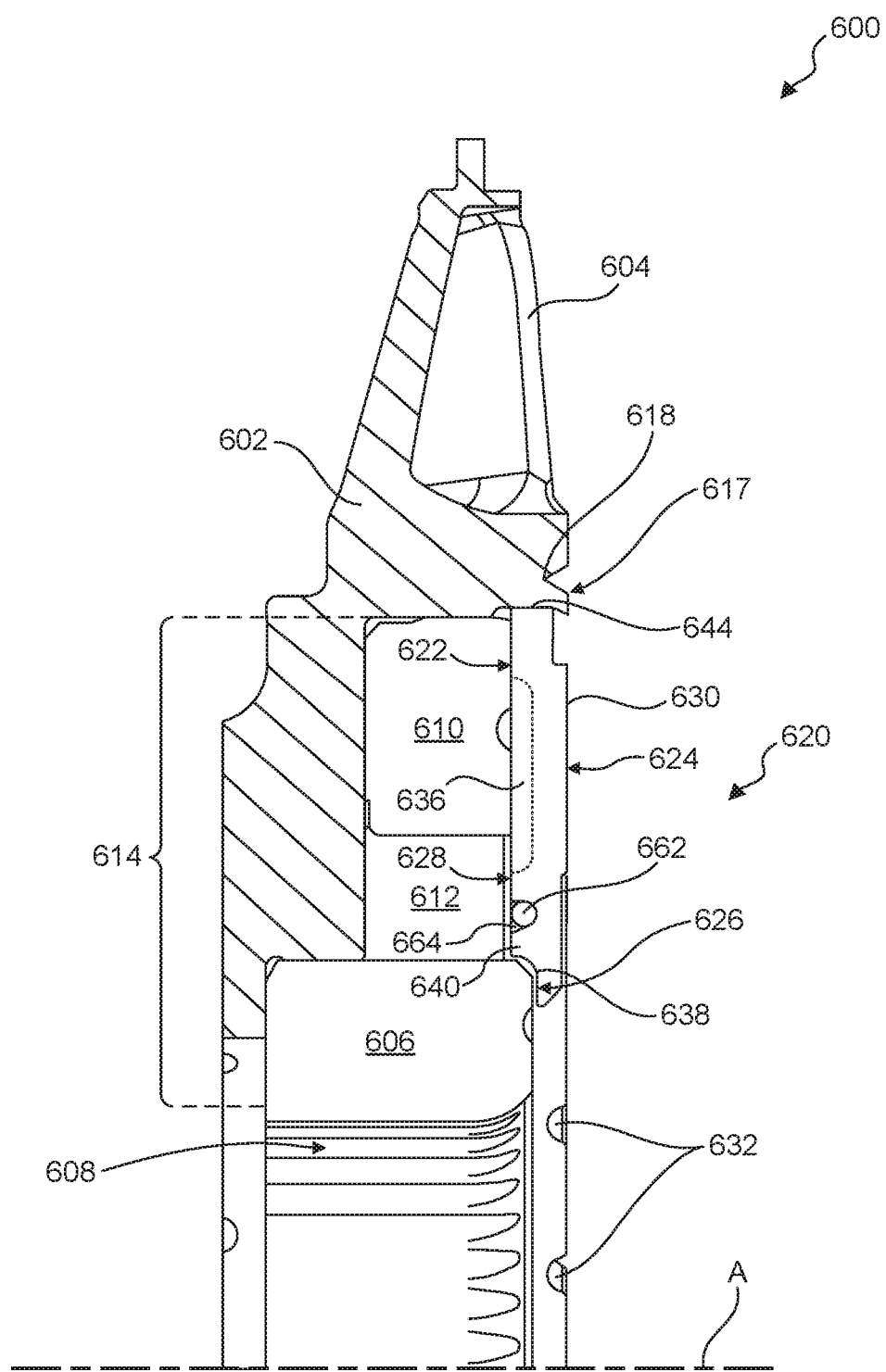
FIG. 6 illustrates a partial cross-sectional view of a hydrodynamic side plate for a stator assembly according to an embodiment.

FIGS. 4-6 illustrate alternative embodiments of staked hydrodynamic side plate 120 and stator assembly 100, and snapped hydrodynamic side plate 220 and stator assembly 200. For example, over time, wear or abrasions can occur to first radial surface 222 of snapped hydrodynamic side plate 220. In particular, during operation wear or abrasions can occur to second axial restriction surface 228, for example, protruding or filleted plateau 240, which restricts locking components 212. When wear or abrasions occur in operation, second axial restriction surface 228 can be replaced in order to restore contact, as described in the following alternative embodiments.

FIG. 4 discloses another embodiment of hydrodynamic side plate 420 and stator assembly 400. The embodiments of snapped hydrodynamic side plate 220 for stator assembly 200 shown in FIGS. 2A and 2B, and the embodiments of hydrodynamic side plate 420 for stator assembly 400 shown in FIG. 4 are similar. Similar reference numbers are used to indicate similar features of the embodiments of snapped hydrodynamic side plate 220 for stator assembly 200 shown in FIGS. 2A and 2B, and similar features of the embodiments of hydrodynamic side plate 420 for stator assembly 400 shown in FIG. 4. Stator assembly 400 includes a radial groove 418 and lead-in chamfer 417, similar to radial groove 218 and lead-in chamfer 217. Hydrodynamic side plate 420 includes snap portion 452 and hollow section 450, similar to snap portion 252 and hollow section 250, respectively. Hydrodynamic side plate 420 includes outer circumferential surface 444, similar to outer circumferential surface 244. Helical spring washer 462 and helical spring washer recess 464 for second axial restriction surface 428 are incorporated into protruding or filleted plateau 440.

Referring to FIG. 4, stator assembly 400 includes one or more radial grooves 418 and lead-in chamfers 417 which couple to one or more snap portions 452 disposed on outer circumferential surface 444 of hydrodynamic side plate 420. Hydrodynamic side plate 420 includes snap portion 452 and hollow section 450. In an embodiment, snap portion 452 includes a notch on a distal end which may couple to radial groove 418. In some embodiments, snap portion 452 and hollow section 450 are integrally formed. In some embodiments, snap portion 452 and hollow section 450 are integrally molded. In some embodiments, snap portion 452 and hollow section 450 are integrally machined. In some embodiments, snap portion 452 and hollow section 450 are integrally extruded. In some embodiments, snap portion 452 and hollow section 450 are monolithic. Hollow section 450 provides flexibility to snap portion 452 in order to bend, snap, and secure snap portion 452 into radial groove 418 and lead-in chamfer 417, which secures hydrodynamic side plate 420 to stator base 402. In some embodiments, hydrodynamic side plate 420 includes at least two anti-rotation tabs (not shown), similar to anti-rotation tabs 234. For example, anti-rotation tabs (not shown) may be spaced apart by about 180 degrees. In some embodiments, hydrodynamic side plate 420 includes at least four anti-rotation tabs (not shown). For example, anti-rotation tabs (not shown) are spaced apart by about 90 degrees.

Hydrodynamic side plate 420 includes second axial restriction surface 428. As shown in FIG. 4, second axial restriction surface 428 can include protruding or filleted plateau 440 with helical spring washer 462 disposed in helical spring washer recess 464. Helical spring washer 462 has an inherent spring force which pushes against locking components 412 and may reduce or prevent further wear or abrasions while maintaining contact between locking components 412 and hydrodynamic side plate 420. Similar to locking components 112, locking components 412 can include rollers and springs (not shown). In some embodiments, helical spring washer 462 can be a metal, a polymer, a ceramic, or any other suitable material that provides a spring recoil force to hold itself in helical spring washer recess 464.

FIG. 5 discloses another embodiment of hydrodynamic side plate 520 and stator assembly 500. The embodiments of staked hydrodynamic side plate 120 for stator assembly 100 shown in FIGS. 1A, 1B, and 3, and the embodiments of hydrodynamic side plate 520 for stator assembly 500 shown in FIG. 5 are similar. Similar reference numbers are used to indicate similar features of the embodiments of staked hydrodynamic side plate 120 for stator assembly 100 shown in FIGS. 1A, 1B, and 3, and similar features of the embodiments of hydrodynamic side plate 520 for stator assembly 500 shown in FIG. 5. Stator assembly 500 includes staking overlaps 517 and staked punches 518, similar to staked punches 118. Hydrodynamic side plate 520 utilizes staking overlaps 517 to secure outer circumferential surface 544, similar to staked punches 118 for outer circumferential surface 144. Injected insert 562 for second axial restriction surface 528 is incorporated into protruding or filleted plateau 540.

Referring to FIG. 5, stator assembly 500 includes staking overlaps 517, formed from staked punches 518, which couple to outer circumferential surface 544 of hydrodynamic side plate 520. In one embodiment, staking overlaps 517 overhang a distal end of outer circumferential surface 544. In one embodiment, staking overlaps 517 are created from conical staking, indicated by staked punches 518. In one embodiment, staking overlaps 517 are created from triangular or tetrahedral staking. In one embodiment, staking overlaps 517 are created from pyramidal staking. In some embodiments, staking overlaps 517 are formed by a lighter point punch staking technique in stator base 502 to create a distinct material overlap with outer circumferential surface 544 of hydrodynamic side plate 520. For example, the lighter point punch staking technique in stator base 502 can reduce material displacement and pressure which may cause cracking or chipping in hydrodynamic side plate 520. Outer circumferential surface 544 is secured by staking overlaps 517 which apply a normal force and wedge hydrodynamic side plate 520 to stator base 502. Staking overlaps 517 in stator base 502 may reduce chipping or damage to hydrodynamic side plate 520. In some embodiments, hydrodynamic side plate 520 includes at least two anti-rotation tabs (not shown) and stator base 502 includes at least two corresponding stator pockets (not shown), similar to anti-rotation tabs 134 and stator pockets 116, respectively. For example, anti-rotation tabs (not shown) and corresponding stator pockets (not shown) are spaced apart by about 180 degrees. In some embodiments, hydrodynamic side plate 520 includes least two staking overlaps 517. For example, staking overlaps 517 are spaced apart by about 180 degrees. In some embodiments, hydrodynamic side plate 520 includes at least four staking overlaps 517. For example, staking overlaps 517 are spaced apart by about 90 degrees. In some embodiments, hydrodynamic side plate 520 includes at least four staking overlaps 517 and stator base 502 includes at least four anti-rotation tabs (not shown) equally spaced apart and equally spaced apart from the other. For example, anti-rotation tabs (not shown) and staking overlaps 517 are spaced apart by about 90 degrees, and anti-rotation tabs (not shown) and staking overlaps 517 are spaced apart from each other by about 45 degrees. In some embodiments, hydrodynamic side plate 520 includes at least eight staking overlaps 517. For example, staking overlaps 517 are spaced apart by about 45 degrees. In some embodiments, hydrodynamic side plate 520 includes at least sixteen staking overlaps 517. For example, staking overlaps 517 are spaced apart by about 22.5 degrees.

Hydrodynamic side plate 520 includes second axial restriction surface 528. As shown in FIG. 5, second axial restriction surface 528 can include injected insert 562 disposed in protruding or filleted plateau 540. Injected insert 562 protrudes above an exterior surface of protruding or filleted plateau 540 and prevents further wear or abrasions while maintaining contact between locking components 512 and hydrodynamic side plate 520. In some embodiments, injected insert 562 can be a metal, a polymer, a ceramic, or any other suitable material that provides a stable contact to locking components 512. In some embodiments, injected insert 562 can be molded (e.g., injection, reaction injection, sintering, laminating, matrix, blow, compression, film insert, gas assist, rotational, structural foam, piece, plastic, casting, spin casting, die casting, transfer, thermoforming, vacuum, etc.) into protruding or filleted plateau 540.

FIG. 6 discloses another embodiment of hydrodynamic side plate 620 and stator assembly 600. The embodiments of staked hydrodynamic side plate 120 for stator assembly 100 shown in FIGS. 1A, 1B, and 3, and the embodiments of hydrodynamic side plate 620 for stator assembly 600 shown in FIG. 6 are similar. Similar reference numbers are used to indicate similar features of the embodiments of staked hydrodynamic side plate 120 for stator assembly 100 shown in FIGS. 1A, 1B, and 3, and similar features of the embodiments of hydrodynamic side plate 620 for stator assembly 600 shown in FIG. 6. Stator assembly 600 includes staking overlaps 617 and staked punches 618, similar to staked punches 118. Hydrodynamic side plate 620 utilizes staking overlaps 617 to secure outer circumferential surface 644, similar to staked punches 118 for outer circumferential surface 144. Coil spring 662 and coil spring groove 664 for second axial restriction surface 628 are incorporated into protruding or filleted plateau 640.

Referring to FIG. 6, stator assembly 600 includes staking overlaps 617, formed from staked punches 618, which couple to outer circumferential surface 644 of hydrodynamic side plate 620. In one embodiment, staking overlaps 617 overhang a distal end of outer circumferential surface 644. In one embodiment, staking overlaps 617 are created from conical staking, indicated by staked punches 618. In one embodiment, staking overlaps 617 are created from triangular or tetrahedral staking. In one embodiment, staking overlaps 617 are created from pyramidal staking. In some embodiments, staking overlaps 617 are formed by a lighter point punch staking technique in stator base 602 to create a distinct material overlap with outer circumferential surface 644 of hydrodynamic side plate 620. For example, the lighter point punch staking technique in stator base 602 can reduce material displacement and pressure which may cause cracking or chipping in hydrodynamic side plate 620. Outer circumferential surface 644 is secured by staking overlaps 617 which apply a normal force and wedge hydrodynamic side plate 620 to stator base 602. Staking overlaps 617 in stator base 602 may reduce chipping or damage to hydrodynamic side plate 620. In some embodiments, hydrodynamic side plate 620 includes at least two anti-rotation tabs (not shown) and stator base 602 includes at least two corresponding stator pockets (not shown), similar to anti-rotation tabs 134 and stator pockets 116, respectively. For example, anti-rotation tabs (not shown) and corresponding stator pockets (not shown) are spaced apart by about 180 degrees. In some embodiments, hydrodynamic side plate 620 includes at least two staking overlaps 617. For example, staking overlaps 617 are spaced apart by about 180 degrees. In some embodiments, hydrodynamic side plate 620 includes at least four staking overlaps 617. For example, staking overlaps 617 are spaced apart by about 90 degrees. In some embodiments, hydrodynamic side plate 620 includes at least four staking overlaps 617 and stator base 602 includes at least four anti-rotation tabs (not shown) equally spaced apart and equally spaced apart from the other. For example, anti-rotation tabs (not shown) and staking overlaps 617 are spaced apart by about 90 degrees, and anti-rotation tabs (not shown) and staking overlaps 617 are spaced apart from each other by about 45 degrees. In some embodiments, hydrodynamic side plate 620 includes at least eight staking overlaps 617. For example, staking overlaps 617 are spaced apart by about 45 degrees. In some embodiments, hydrodynamic side plate 620 includes at least sixteen staking overlaps 617. For example, staking overlaps 617 are spaced apart by about 22.5 degrees.

Hydrodynamic side plate 620 includes second axial restriction surface 628. As shown in FIG. 6, second axial restriction surface 628 can include protruding or filleted plateau 640 with coil spring 662 disposed in coil spring groove 664. Coil spring 662 has an inherent spring force which pushes against an outer wall of coil spring groove 664 and prevents further wear or abrasions while maintaining contact between locking components 612 and hydrodynamic side plate 620. In some embodiments, coil spring 662 can be a metal, a polymer, a ceramic, or any other suitable material that provides a spring recoil force to an outer wall of coil spring groove 664.

Figure 7:
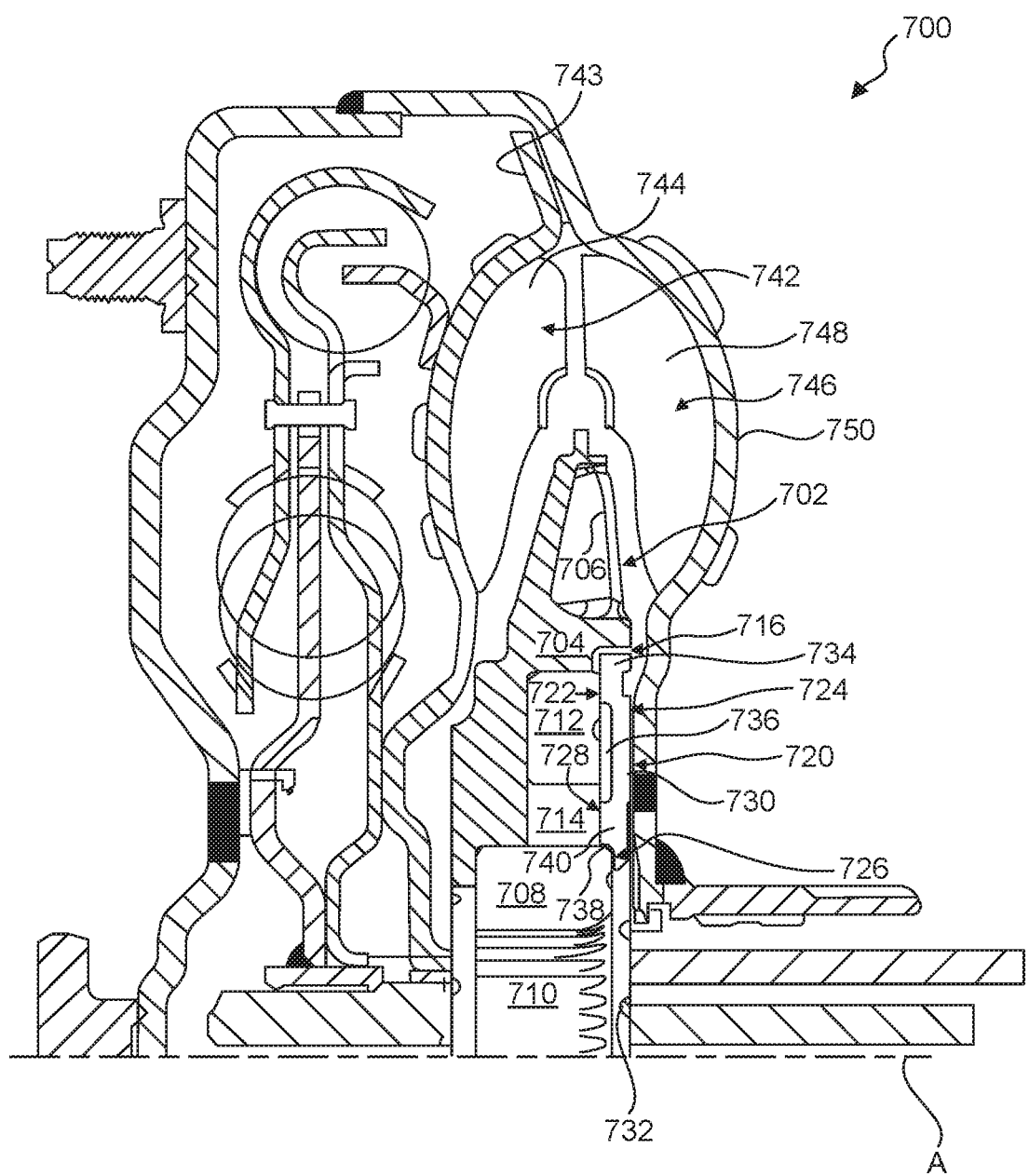
FIG. 7 illustrates a partial cross-sectional side view of a torque converter with a stator assembly and a hydrodynamic side plate according to an embodiment.

Referring to FIG. 7, torque converter 700 includes stator assembly 702, turbine 742, impeller 746, and hydrodynamic side plate 720. The embodiments of staked hydrodynamic side plate 120 for stator assembly 100 shown in FIGS. 1A, 1B, and 3, and the embodiments of hydrodynamic side plate 720 for torque converter 700 shown in FIG. 7 are similar. Similar reference numbers are used to indicate similar features of the embodiments of staked hydrodynamic side plate 120 for stator assembly 100 shown in FIGS. 1A, 1B, and 3, and similar features of the embodiments of hydrodynamic side plate 720 for torque converter 700 shown in FIG. 7.

Stator assembly 702 includes stator base 704 including a plurality of stator blades 706, inner race 708 including a plurality of splines 710, outer race 712, and locking components 714 disposed between inner race 708 and outer race 712. Inner race 708 is splined via the plurality of splines 710 to a stator assembly shaft (not shown). Turbine 742 includes turbine shell 743 and a plurality of turbine blades 744. Impeller 746 includes impeller shell 750 and a plurality of impeller blades 748.

Similar to stator assembly 100 of FIGS. 1A, 1B, and 3, stator assembly 702 includes stator pockets 716 and one-way clutch (tag not shown), including inner race 708, locking components 714, and outer race 712. Similar to staked hydrodynamic side plate 120 of FIGS. 1A, 1B, and 3, hydrodynamic side plate 720 is a single formed piece with hydrodynamic pads 730 and radial grooves 732 in second radial surface 724. Hydrodynamic side plate 720 functions as a thrust bearing and a stator side plate simultaneously. Hydrodynamic side plate 720 is disposed on stator base 704 of stator assembly 702 and secured by anti-rotation tabs 734 disposed in stator pockets 716 and staked punches (not shown) on stator base 704, similar to anti-rotation tabs 134 in stator pockets 116 and staked punches 118 on stator base 704. In operation, as fluid is introduced and adheres to second radial surface 724, the fluid forms a converging wedge from high shear forces and internal pressure builds allowing the fluid to permeate radially outward, via radial grooves 732 and hydrodynamic pads 730, between second radial surface 724 and impeller shell 750. Both stator assembly 702 and hydrodynamic side plate 720 are aligned along rotational axis A.

Hydrodynamic side plate 720 is defined by first radial surface 722 and second radial surface 724 opposite first radial surface 722, and forms a generally flat annulus. Second radial surface 724 includes hydrodynamic pads 730 and radial grooves 732. Hydrodynamic pads 730 form a raised annulus in second radial surface 724, and each hydrodynamic pad 730 is separated by uniformly recessed radial grooves 732. In some embodiments, staked punches (not shown) can include interference fits for securing hydrodynamic side plate 720 to stator base 704. In some embodiments, hydrodynamic side plate 720 includes at least two anti-rotation tabs 734. For example, anti-rotation tabs 734 are spaced apart by about 180 degrees. In some embodiments, hydrodynamic side plate 720 includes at least four anti-rotation tabs 734. For example, anti-rotation tabs 734 are spaced apart by about 90 degrees. First radial surface 722 of hydrodynamic side plate 720 secures one-way clutch (tag not shown) of stator assembly 702. Locking components 714 can include rollers and springs (not shown) disposed in wedge shaped segments (not shown).

Similar to staked hydrodynamic side plate 120 of FIGS. 1A, 1B, and 3, hydrodynamic side plate 720 can be formed by known manufacturing processes and methods in the art, not limited to molding (e.g., injection, reaction injection, sintering, laminating, matrix, blow, compression, film insert, gas assist, rotational, structural foam, piece, plastic, casting, spin casting, die casting, transfer, thermoforming, vacuum, etc.), machining (e.g., milling, turning, drilling, reaming, sawing, filing, fettling, boring, broaching, shaping, planing, tapping, electrical discharge, EDM, electrochemical, electron beam, photochemical, ultrasonic, laser cutting, water jet cutting, etc.), extrusion (e.g., profile, hot, cold, warm, friction, micro, direct, indirect, hydrostatic, etc.), or any other suitable process or method. Hydrodynamic side plate 720 can be a metal (e.g., copper, aluminum, titanium, iron, cast iron, steel, etc.), a polymer (e.g., plastic, thermoplastic, polyamide, Torlon®, polytetrafluoroethylene (PTFE), polyether, polyether ether ketone (PEEK), resin, polyoxymethylene, phenolics, acetals, nylon, rigid machinable polymer, etc.), a ceramic (e.g., zirconia, silicon nitride, alumina, silicon carbide, etc.), or any other suitable material. In some embodiments, hydrodynamic side plate 720 is rigid. In some embodiments, hydrodynamic side plate 720 is flexible. In some embodiments, hydrodynamic side plate 720 has suitable mechanical properties, wear resistance, and/or ample flexibility.

Referring to FIG. 7, hydrodynamic side plate 720 includes first axial restriction surface 726, second axial restriction surface 728, and one or more empty pockets 736. First axial restriction surface 726 restricts the axial movement of inner race 708 along rotational axis A. First axial restriction surface 726 includes flat recess 738. In some embodiments, flat recess 738 is a flat recess formed in first radial surface 722, for example, by machining or molding first radial surface 722. In some embodiments, flat recess 738 is a flat recess formed in first radial surface 722, for example, by integrally molding or joining an additional piece to first radial surface 722. In some embodiments, flat recess 738 is a flat recess formed in first radial surface 722, for example, by machining or molding first radial surface 722. In some embodiments, flat recess 738 is a flat recess formed in first radial surface 722, for example, by integrally molding or joining an additional piece to first radial surface 722. In some embodiments, first axial restriction surface 726 can be a bevel, a chamfer, an arc shape, or any other suitable shape matching the opposing surfaces to axially restrict inner race 708. Second axial restriction surface 728 restricts the axial movement of locking components 714, such as rollers and springs (not shown) disposed in wedge shaped segments (not shown), along rotational axis A. Second axial restriction surface 728 includes protruding or filleted plateau 740. In some embodiments, protruding or filleted plateau 740 is a protruding plateau formed in first radial surface 722, for example, by machining or molding first radial surface 722. In some embodiments, protruding or filleted plateau 740 is a filleted plateau formed in first radial surface 722, for example, by integrally molding or joining an additional piece to first radial surface 722. In some embodiments, second axial restriction surface 728 can be a mesa, a butte, a convex shape, or any other suitable shape to axially restrict locking components 714. One or more empty pockets 736 are formed in hydrodynamic side plate 720 to reduce overall mass and material cost. One or more empty pockets 736 are formed in first radial surface 722 and positioned opposite hydrodynamic pads 730 in second radial surface 724.

In some embodiments, hydrodynamic side plate 720 and stator assembly 702 can be staked hydrodynamic side plate 120 and stator assembly 100 for torque converter 700. In some embodiments, hydrodynamic side plate 720 and stator assembly 702 can be snapped hydrodynamic side plate 220 and stator assembly 200 for torque converter 700. In some embodiments, hydrodynamic side plate 720 and stator assembly 702 can be hydrodynamic side plate 420 and stator assembly 400 for torque converter 700. In some embodiments, hydrodynamic side plate 720 and stator assembly 702 can be hydrodynamic side plate 520 and stator assembly 500 for torque converter 700. In some embodiments, hydrodynamic side plate 720 and stator assembly 702 can be hydrodynamic side plate 620 and stator assembly 600 for torque converter 700.

It is to be appreciated that the Detailed Description section, and not the Brief Summary and Abstract sections, is intended to be used to interpret the claims. The Summary and Abstract sections may set forth one or more but not all exemplary embodiments of the hydrodynamic side plate for a stator assembly in a torque converter as contemplated by the inventor, and thus, are not intended to limit the present embodiments and the appended claims in any way.

The foregoing description of the specific embodiments will so fully reveal the general nature of embodiments that others can, by applying knowledge within the skill of the art, readily modify and/or adapt for various applications of such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

PARTS LIST 100 stator assembly
102 stator base
104 plurality of stator blades
106 inner race
108 plurality of splines
110 outer race
112 locking components
114 one-way clutch
116 stator pockets
118 staked punches
120 staked hydrodynamic side plate 122 first radial surface
124 second radial surface
126 first axial restriction surface
128 second axial restriction surface
130 hydrodynamic pads
132 radial grooves
134 anti-rotation tabs
136 one or more empty pockets
138 flat recess
140 protruding or filleted plateau
142 inner circumferential surface
144 outer circumferential surface
146 inner hydrodynamic pad circumferential surface
148 outer hydrodynamic pad circumferential surface
200 stator assembly
202 stator base
204 plurality of stator blades
206 inner race
208 plurality of splines
210 outer race
212 locking components
214 one-way clutch
216 stator pockets
217 lead-in chamfer
218 radial groove
220 snapped hydrodynamic side plate
222 first radial surface
224 second radial surface
226 first axial restriction surface
228 second axial restriction surface
230 hydrodynamic pads
232 radial grooves
234 anti-rotation tabs
236 one or more empty pockets
238 flat recess
240 protruding or filleted plateau
242 inner circumferential surface
244 outer circumferential surface
246 inner hydrodynamic pad circumferential surface
248 outer hydrodynamic pad circumferential surface
250 hollow section
252 snap portion
400 stator assembly
402 stator base
404 plurality of stator blades
406 inner race
408 plurality of splines
410 outer race
412 locking components
414 one-way clutch
417 lead-in chamfer
418 radial groove
420 hydrodynamic side plate
422 first radial surface
424 second radial surface
426 first axial restriction surface
428 second axial restriction surface
430 hydrodynamic pads
432 radial grooves
436 one or more empty pockets
438 flat recess
440 protruding or filleted plateau
444 outer circumferential surface
450 hollow section
452 snap portion
462 helical spring washer
464 helical spring washer recess
500 stator assembly
502 stator base
504 plurality of stator blades
506 inner race
508 plurality of splines
510 outer race
512 locking components
514 one-way clutch
517 staking overlaps
518 staked punches
520 hydrodynamic side plate
522 first radial surface
524 second radial surface
526 first axial restriction surface
528 second axial restriction surface
530 hydrodynamic pads
532 radial grooves
536 one or more empty pockets
538 flat recess
540 protruding or filleted plateau
544 outer circumferential surface
562 injected insert
600 stator assembly
602 stator base
604 plurality of stator blades
606 inner race
608 plurality of splines
610 outer race
612 locking components
614 one-way clutch
617 staking overlaps
618 staked punches
620 hydrodynamic side plate
622 first radial surface
624 second radial surface
626 first axial restriction surface
628 second axial restriction surface
630 hydrodynamic pads
632 radial grooves
636 one or more empty pockets
638 flat recess
640 protruding or filleted plateau
644 outer circumferential surface
662 coil spring
664 coil spring groove
700 torque converter
702 stator assembly
704 stator base
706 plurality of stator blades
708 inner race
710 plurality of splines
712 outer race
714 locking components
716 stator pockets
720 hydrodynamic side plate
722 first radial surface
724 second radial surface
726 first axial restriction surface
728 second axial restriction surface
730 hydrodynamic pads
732 radial grooves
734 anti-rotation tabs
736 one or more empty pockets
738 flat recess
740 protruding or filleted plateau
742 turbine
743 turbine shell 744 plurality of turbine blades
746 impeller
748 plurality of impeller blades
750 impeller shell
A rotational axis

What is claimed is:

1. A hydrodynamic side plate for a stator in a torque converter, the hydrodynamic side plate comprising:
   a first radial surface;
   a second radial surface opposite the first radial surface;
   a first axial restriction surface configured to be on the first radial surface opposite an inner race of a stator assembly;
   a second axial restriction surface configured to be on the first radial surface opposite locking components of the stator assembly; and
   a plurality of hydrodynamic pads in the second radial surface separated by a plurality of corresponding radial grooves,
   wherein the first axial restriction surface is configured to restrict axial movement of the inner race of the stator assembly,
   wherein the second axial restriction surface is configured to restrict axial movement of the locking components of the stator assembly,
   wherein the second radial surface comprises at least two anti-rotation tabs configured to prevent relative motion with the stator assembly, and
   wherein the first radial surface comprises one or more empty pockets opposite the plurality of hydrodynamic pads.

2. The hydrodynamic side plate of claim 1, wherein the first axial restriction surface is a flat recess.

3. The hydrodynamic side plate of claim 1, wherein the second axial restriction surface is a protruding plateau or filleted plateau.

4. The hydrodynamic side plate of claim 1, wherein:
   the second axial restriction surface comprises a recess and a helical spring washer disposed in the recess.

5. The hydrodynamic side plate of claim 1, wherein the second axial restriction surface comprises an injected insert.

6. The hydrodynamic side plate of claim 1, wherein:
   the second axial restriction surface comprises a groove and a coil spring disposed in the groove.

7. The hydrodynamic side plate of claim 1, wherein the at least two anti-rotation tabs are configured to be disposed in at least two stator pockets of the stator assembly.

8. The hydrodynamic side plate of claim 1, further comprising a hollow section and a snap portion, wherein the snap portion is configured to snap fit into a radial groove of the stator assembly through a lead-in chamfer.

9. The hydrodynamic side plate of claim 1, further comprising an outer circumferential surface configured to be retained in at least two overhangs of the stator assembly.

10. A stator assembly comprising:
    a base including a plurality of stator blades;
    an inner race including a plurality of splines;
    an outer race;
    locking components disposed between the inner and outer races, configured to function as a one-way clutch; and
    a hydrodynamic side plate disposed on the stator assembly, configured to secure the one-way clutch in place within the stator assembly, and comprising:
    a first radial surface;
    a second radial surface opposite the first radial surface;
    a first axial restriction surface on the first radial surface opposite the inner race of the stator assembly;
    a second axial restriction surface on the first radial surface opposite the locking components of the stator assembly; and
    a plurality of hydrodynamic pads in the second radial surface separated by a plurality of corresponding radial grooves,
    wherein the first axial restriction surface is configured to restrict axial movement of the inner race of the stator assembly,
    wherein the second axial restriction surface is configured to restrict axial movement of the locking components of the stator assembly,
    wherein the second radial surface comprises at least two anti-rotation tabs configured to prevent relative motion with the stator assembly, and
    wherein the first radial surface comprises a plurality of one or more empty pockets opposite the plurality of hydrodynamic pads.

11. The stator assembly of claim 10, wherein:
    the first axial restriction surface is a flat recess; and
    the second axial restriction surface is a protruding plateau or filleted plateau.

12. The stator assembly of claim 10, wherein:
    the at least two anti-rotation tabs are disposed in at least two stator pockets of the stator assembly.

13. The stator assembly of claim 10, wherein the hydrodynamic side plate further comprises a hollow section and a snap portion, wherein:
    the second axial restriction surface comprises a recess and a helical spring washer disposed in the recess; and
    the snap portion is configured to snap fit into a radial groove of the stator assembly through a lead-in chamfer.

14. The stator assembly of claim 10, wherein the hydrodynamic side plate further comprises an outer circumferential surface, wherein:
    the second axial restriction surface comprises a groove and a coil spring disposed in the groove; and
    the outer circumferential surface is retained in at least two overhangs of the stator assembly.

15. A torque converter comprising:
    a stator assembly comprising:
    a base including a plurality of stator blades;
    an inner race including a plurality of splines;
    an outer race; and
    locking components disposed between the inner and outer races;
    a turbine including a plurality of turbine blades;
    an impeller including a plurality of impeller blades and an impeller shell; and
    a hydrodynamic side plate disposed between the stator assembly and the impeller shell, and comprising:
    a first radial surface;
    a second radial surface opposite the first radial surface;
    a first axial restriction surface on the first radial surface opposite the inner race of the stator assembly;
    a second axial restriction surface on the first radial surface opposite the locking components of the stator assembly; and
    a plurality of hydrodynamic pads on the second radial surface separated by a plurality of corresponding radial grooves,
    wherein the first axial restriction surface is configured to restrict axial movement of the inner race of the stator assembly, wherein the second axial restriction surface is configured to restrict axial movement of the locking components of the stator assembly;

wherein the second radial surface comprises at least two anti-rotation tabs configured to prevent relative motion with the stator assembly, and wherein the first radial surface comprises a plurality of one or more empty pockets opposite the plurality of hydrodynamic pads.

16. The torque converter of claim 15, wherein:
the first axial restriction surface is a flat recess; and
the second axial restriction surface is a protruding plateau or filleted plateau.

17. The stator assembly of claim 15, wherein:
the at least two anti-rotation tabs are disposed in at least two stator pockets of the stator assembly.

18. The torque converter of claim 15, wherein the hydrodynamic side plate further comprises a hollow section and a snap portion, wherein:
the second axial restriction surface comprises a recess and a helical spring washer disposed in the recess; and
the snap portion is configured to snap fit into a radial groove of the stator assembly through a lead-in chamfer.

19. The torque converter of claim 15, wherein the hydrodynamic side plate further comprises an outer circumferential surface, wherein:
the second axial restriction surface comprises a groove and a coil spring disposed in the groove; and
the outer circumferential surface is retained in at least two overhangs of the stator assembly.

* * * * *